United States Patent
Dudek et al.

(10) Patent No.: US 8,576,325 B2
(45) Date of Patent: Nov. 5, 2013

(54) GENERATING STILL IMAGES AND VIDEO BY CAPTURE OF IMAGES PROJECTED BY LIGHT PASSING THROUGH A DISPLAY SCREEN

(75) Inventors: Clark A. Dudek, Raleigh, NC (US); Phillip D. Jones, Raleigh, NC (US); David B. Roberts, Cary, NC (US); Adrian X. Rodriguez, Durham, NC (US); Rupal S. Soneji, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 13/006,284

(22) Filed: Jan. 13, 2011

(65) Prior Publication Data

US 2012/0182437 A1 Jul. 19, 2012

(51) Int. Cl.
*H04N 7/14* (2006.01)
(52) U.S. Cl.
USPC .......... 348/344; 348/220.1; 348/333.01; 348/333.09; 348/14.16; 345/632
(58) Field of Classification Search
USPC ......... 348/220.1, 14.16, 333.01, 333.09, 344; 345/632
See application file for complete search history.

(56) References Cited

U.S. PATENT DOCUMENTS

| | | | |
|---|---|---|---|
| 4,928,301 A | 5/1990 | Smoot | |
| 5,282,027 A | 1/1994 | Tanigaki et al. | |
| 5,340,978 A * | 8/1994 | Rostoker et al. | 250/208.1 |
| 6,084,560 A | 7/2000 | Miyamoto | |
| 6,670,996 B2 | 12/2003 | Jiang | |
| 7,535,468 B2 * | 5/2009 | Uy | 345/207 |
| 7,697,053 B2 * | 4/2010 | Kurtz et al. | 348/333.01 |
| 7,714,923 B2 * | 5/2010 | Cok et al. | 348/333.01 |
| 7,773,109 B2 | 8/2010 | Fredlund et al. | |
| 8,223,188 B2 * | 7/2012 | Ryf et al. | 348/14.01 |
| 8,253,770 B2 * | 8/2012 | Kurtz et al. | 348/14.01 |
| 8,446,514 B2 * | 5/2013 | Border et al. | 348/344 |
| 2004/0140973 A1 | 7/2004 | Zanaty | |
| 2005/0110865 A1 | 5/2005 | Wintzen et al. | |
| 2006/0007222 A1 * | 1/2006 | Uy | 345/207 |
| 2007/0002130 A1 | 1/2007 | Hartkop | |
| 2007/0097268 A1 | 5/2007 | Relan et al. | |
| 2008/0106628 A1 * | 5/2008 | Cok et al. | 348/333.01 |
| 2008/0106629 A1 * | 5/2008 | Kurtz et al. | 348/333.01 |

(Continued)

OTHER PUBLICATIONS

"Apple Patent Embeds Thousand of Cameras Among LCD Pixels—Engadget," Downloaded: Dec. 2, 2010, Evan Blass, Web Address: http://www.engadget.com/2006/04/26/apple-patent-embeds-thousands-of-cameras-among.

*Primary Examiner* — Antoinette Spinks
(74) *Attorney, Agent, or Firm* — Olive Law Group, PLLC

(57) ABSTRACT

Methods and systems for generating still images and video by capture of images projected by light passing through a display screen are disclosed. According to an aspect, a method includes controlling light emitting components of a display screen to activate in a sequence for displaying a sequence of images. For example, in an organic light emitting diode (OLED) display screen, the method may include controlling a subset of the display screen OLEDs to activate in sequence to display a sequence of images. The displayed sequence of images may appear to a viewer of the display screen to be a still image or a video. The method may control light emitting components different subsets of the LEDs to be activated in the sequence, such that different areas of the display screen display images in each part of the sequence.

15 Claims, 5 Drawing Sheets

(56) References Cited

U.S. PATENT DOCUMENTS

| | | |
|---|---|---|
| 2009/0102763 A1 | 4/2009 | Border et al. |
| 2009/0295943 A1 | 12/2009 | Kim et al. |
| 2010/0073456 A1 | 3/2010 | Bolle |
| 2011/0279689 A1* | 11/2011 | Maglaque .................. 348/207.1 |
| 2011/0285861 A1* | 11/2011 | Maglaque .................. 348/207.1 |
| 2011/0285891 A1* | 11/2011 | Maglaque ..................... 348/308 |

* cited by examiner

GENERATING STILL IMAGES AND VIDEO BY CAPTURE OF IMAGES PROJECTED BY LIGHT PASSING THROUGH A DISPLAY SCREEN

BACKGROUND

1. Field of the Invention

The present invention relates to displays and image capture equipment, and more specifically, to display screens for displaying images and image capture devices for use in generating still images and video by capture of images projected by light passing through the display screens.

2. Description of Related Art

Display screens are often integrated into electronic equipment for displaying text, still images, and video to a user of the electronic equipment. Efforts on ongoing to support and increase the functionality of display screens, especially in mobile computing applications, such as smartphone technologies, where it is desirable to reduce the size and weight of such devices. By integrating the functionality of other components into a display screen, the size and weight of electronic equipment including the display screen may be reduced.

Image capture functionality is a feature of electronic devices that has become commonplace for capturing still images and video. For example, image capture devices have been integrated into many electronic devices, such as, smart phones, automated teller machines (ATMs), laptop computers, and desktop computers. In such devices, an image capture device and a display screen are often positioned on a side of a housing of the devices such that the display screen can be viewed by a user, while at the same time, an image of the user and any background scenery can be captured by the image capture device. Such simultaneous use is common in video conferencing applications. Display screens and image capture devices can require a considerable area of a side of the electronic device. Accordingly, for at least this reason, it is desirable to integrate display screens and image capture devices in electronic devices for reducing space and size consumption.

BRIEF SUMMARY

One or more embodiments of the present invention provide methods and systems for generating still images and video by capture of images projected by light passing through a display screen. In accordance with embodiments of the present invention, a method includes controlling light emitting components of a display screen to activate in a sequence for displaying a sequence of images. For example, the method may include controlling a subset of the display screen organic light emitting diodes (OLEDs) to activate in sequence to display a sequence of images. The displayed sequence of images may appear to a viewer or user of the display screen to be a still image or a video. The method may control different subsets of the light emitting components to be activated in the sequence, such that different areas of the display screen display images in each part of the sequence.

The method may also include controlling other light emitting components of the display screen that are not activated for displaying the images to be inactive such that a portion of the display screen is at least partially transparent for allowing light to pass therethrough. The light passing through the display screen may project a sequence of images on an image capture device. Continuing the aforementioned example, the OLEDs may be transparent OLEDs that are at least partially transparent when inactive. When the OLEDs are controlled to be inactive, the corresponding portions of the display screen become at least partially transparent for allowing light to pass therethrough towards an image capture device positioned behind the display screen. The light may project a sequence of images on the image capture device, and the image capture device may capture the sequence of images at the same or similar rate as the display screen displays images. The images may be of a scene including, for example, a viewer of the display screen and any scenery near the viewer. In an example, different groups of the light emitting components may be controlled to become inactive in a sequence for allowing different portions of an image of the scene to be projected onto the image capture device. The method may include controlling the image capture device to capture the different portions of the image of the scene. The captured image portions may be stitched together for generating a composite image of the scene.

DETAILED DESCRIPTION

Figure 1:
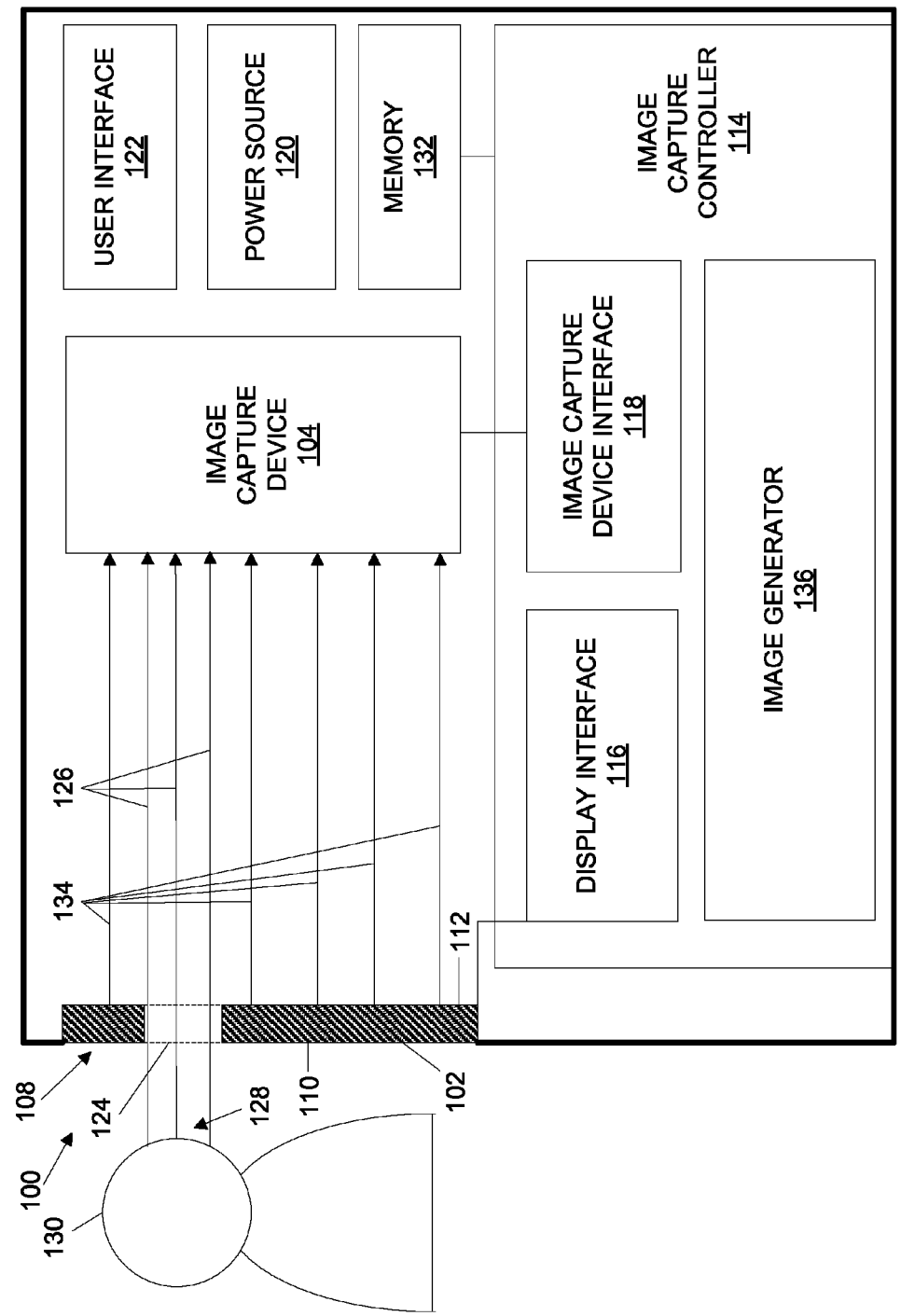
FIG. 1 is a schematic side elevational view of a system for generating still images and video by capture of images projected by light passing through a display screen in accordance with embodiments of the present invention.

Exemplary systems and methods for generating still images and video by capture of images projected by light passing through a display screen in accordance with embodiments of the present invention are described herein. Particularly, described herein are systems and methods for controlling light emitting components of a display screen to activate in a sequence for displaying a sequence of images or video. An example system may be an electronic device including a display screen and an image capture device positioned behind the display screen within the electronic device. An example method may include controlling other light emitting components of the display screen that are not activated for displaying the images to be inactive such that a portion of the display screen is at least partially transparent for allowing light to pass therethrough to thereby project a sequence of images on the image capture device. The image capture device may capture the sequence of projected images. The example method may also include generating a still image based on the captured sequence of projected images. For example, the captured sequence of projected images may represent components of a scene, and the component may be stitched together for generating a still image of the scene.

As referred to herein, the term "display screen" is a component of a display device configured for displaying images to a viewer. An example of a display screen includes an organic light emitting diode (OLED) display, which may include an emissive electroluminescent layer of organic compounds which emit light in response to an electric current. In an OLED display, the layer of organic semiconductor material may be situated between two electrodes, one or both of which may be transparent. Other examples of display screens include, but are not limited to, a liquid crystal display (LCD), a thin film transistor-liquid crystal display (TFT-LCD), a flexible display, a three-dimensional display, a touch screen display, or the like. These display screens can be configured to have portions that are transparent or at least partially transparent in accordance with embodiments of the present invention such that light may pass therethrough.

As referred to here, the term "image capture device" is any suitable device for capturing images of a scene. For example, an image capture device may be a video or digital camera having an electronic image sensor, such as a charge coupled device (CCD) or a CMOS sensor, configured to capture images which can be transferred or stored in a memory or any other suitable storage for later playback or processing. The camera may capture many images in a sequence for storage as video. An image capture device may include a lens for capturing the light from a subject and bringing the light into focus on the electronic image sensor.

As referred to herein, the term "image data" is data suitable for interpretation by a computing device for representing an image. For example, image data may be stored in a digital image file format such as, but not limited to, PNG, JPEG, GIF, Exif, TIFF, RAW, BMP, PPM, PGM, PBM, PNM, and WEBP. A sequence of image, or video, may be stored in a suitable format such as MPEG. Image files may be composed of either pixel or vector (geometric) data that may be rasterized to pixels when displayed in a vector graphic display, such as a suitable display screen. The pixels that constitute an image are ordered as a grid (column and rows), each pixel consisting of numbers representing magnitudes of brightness and color.

As referred to herein, the term "memory" is one or more components configured to store data. For example, memory may store a program for the processing and control of a controller. Memory may also temporarily store input/output data (e.g., still images, video, and the like). Also, the memory may be implemented using any type of suitable storage medium including, for example, but not limited to, flash memory, a hard disk, a multimedia card micro type, a memory card (e.g., SD or DX memory), random access memory (RAM), static random access memory (SRAM), read-only memory (ROM), electrically erasable programmable read-only memory (EEPROM), programmable read-only memory (PROM), magnetic memory, magnetic disk, optical disk, and the like. Further, for example, the memory may be implemented via web storage which performs the storage function of the memory on the Internet, or via any other suitable type of network memory storage.

FIG. 1 illustrates a schematic side elevational view of a system 100 for generating still images and video by capture of images projected by light passing through a display screen 102 in accordance with embodiments of the present invention. Referring to FIG. 1, the system 100 may operate in an image capture and display mode in which the display screen 102 displays a sequence of images or video for view, and in which an image capture device 104 captures a sequence of images projected thereon by light passing through one or more transparent or at least partially transparent portions of the display screen 102. The display screen 102 may display the sequence of images at a frame rate, or frame frequency, that is suitable for a viewer of the display without showing undesirable image noise or disturbance. For example, the frame rate may be at least 25 frames per second. The image capture device 104 may also capture images in a sequence at the same rate as the frame rate of the display screen 102, or any other suitable image capture rate. The system may generate one or more still images by use of the captured sequence of projected images.

Some or all of the components of the system 100 may be contained within an enclosure 106 such as a housing of an electronic device such as, for example, but not limited to, a laptop computer, desktop display, television, mobile computing device, mobile telephone, or other electronic devices. More generally, the system 100 may be implemented in any electronic device having display and image capture functions. The enclosure 106 may define an opening or window 108 on a front side. The display screen 102 may be positioned along the front side of the enclosure 106, adjacent to the opening or window 108. The display screen 102 has a front display side 110 and a back side 112. In this example, the display screen 102 may be an OLED screen, although any other suitable type of display screen may be used.

The system 100 may include an image capture controller 114 configured to control operation in the image capture and display mode in accordance with embodiments of the present invention. For example, the controller 114 may include a display interface 116 for interfacing with the display screen 102. The controller 114 may include an image capture device interface 118 for interfacing with the image capture device 104. The interfaces 116 and 118 may be drivers or other components suitably configured to control the display screen 102 and the image capture device 104, respectively. The controller 114 may include suitable hardware, software, firmware, or combinations thereof for implementing processes in accordance with embodiments of the present invention described herein. One or more power sources 120 may provide the power necessary to operate the display screen 102, the image capture device 104, and the controller 114.

Figure 2:
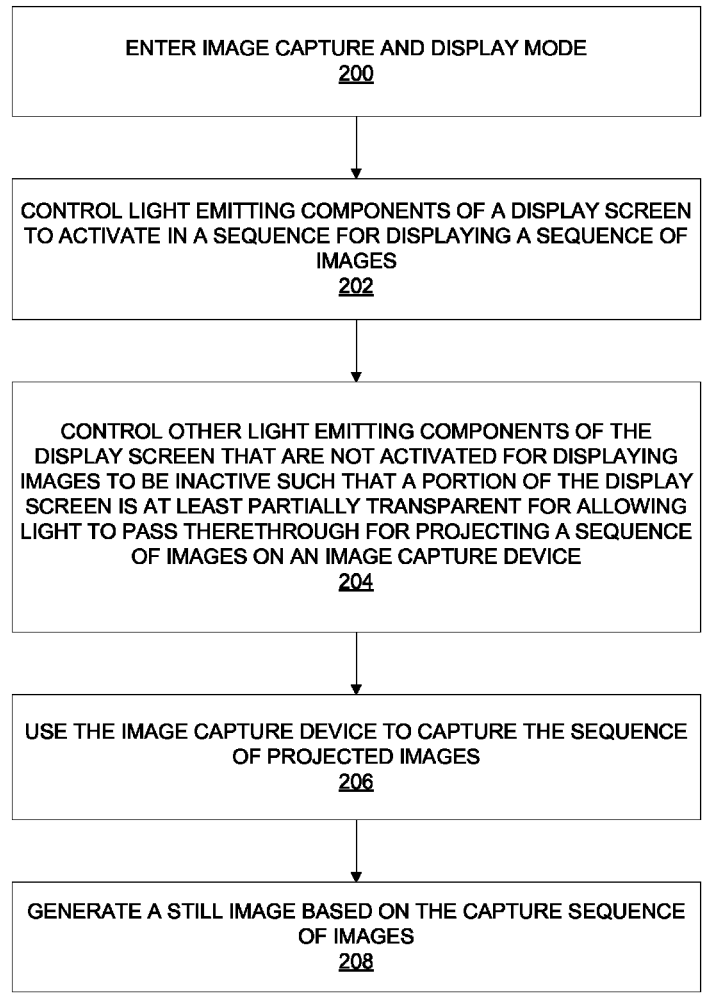
FIG. 2 is a flowchart of a method for controlling a display screen and image capture device to display images and to generate a still image or frame of a video in accordance with embodiments of the present invention.

In the image capture and display mode, the system 100 may display still images or video while capturing still images or video of a scene. For example, FIG. 2 illustrates a flowchart of a method for controlling a display screen and image capture device to display images and to generate a still image or frame of a video in accordance with embodiments of the present invention. The method of FIG. 2 is described as being implemented by the system 100 shown in FIG. 1, although the method may be implemented by any system including a suitable display screen and image capture device.

Referring to FIG. 2, the method of FIG. 2 includes entering 200 the image capture and display mode. For example, a user of the system 100 may interact with a user interface 122 to enter user input for controlling the system 100 to enter the image capture and display mode. The user interface 122 may be any suitable component configured to receive and to process user input. For example, the user interface 122 may be a touch screen display, keyboard, keypad, mouse, track pad, and the like. Alternatively, for example, entry into this mode may be automatically affected by an application residing on the system 100 and implementing display and image capture functions.

The method of FIG. 2 includes controlling 202 light emitting components of a display screen to activate in a sequence for displaying a sequence of images. For example, the controller 114 may be configured to control light emitting components of the display screen 102 to display a sequence of images or video. The images or video may be stored in a suitable format in a memory 124 of the system 100. As an example, the light emitting components may be LEDs that can be individually activated for emitting different colors of light at varying brightness to appear as an image to a viewer facing the front side 110 of the display screen 102. In accordance with one or more embodiments of the present invention, the display screen 102 may include a matrix of OLEDs that are each electronically switchable between an "on" state and an "off" state. The display interface 118 can control application of electrical current to a predetermined set of the OLEDs for switching the OLEDs between the on and off states. The predetermined set of OLEDs may be a subset of the OLEDs in the matrix. In an example, the same subset of OLEDs in the matrix may be activated in a sequence at a predetermined frame rate for displaying a still image or video over a period of time. In another example, different subsets of the OLEDs in the matrix may be activated in a sequence for displaying a sequence of images or video over a period of time. By activating different subsets of OLEDs in the matrix, different areas of the display screen are activated in the sequence for displaying the sequence of images. The subset of OLEDs activated in the sequence may be a majority of the OLEDs in the matrix.

The method of FIG. 2 includes controlling 204 other light emitting components of the display screen that are not activated for displaying the images to be inactive such that a portion of the display screen is at least partially transparent for allowing light to pass therethrough for projecting a sequence of images on an image capture device. Continuing the aforementioned example of a matrix of OLEDs, the controller 114 may control a subset of the OLEDs in the matrix that are not activated for displaying the images at 202 to be inactive such that a portion of the OLED display screen is at least partially transparent for allowing light to pass therethrough for projecting a sequence of images on the image capture device 104. The projected sequence of images may each be a portion of a scene near the display screen 102. The scene may include a viewer of the display screen 102, a user of the system 100, and/or any nearly scenery or objects. The different images may be projected onto the image capture device 104 over a period of time. Images displayed by the display screen 102 may also be projected onto the image capture device 104.

Continuing the example of FIG. 1, when the system 100 is operating in the image capture and display mode, light may pass through a transparent portion, or at least partially transparent portion, of the display screen 102, and may project an image onto an electronic image sensor of the image capture device 104. For example, the display interface 118 of the controller 116 can control a subset of OLEDs generally located at a portion 124 of the display screen 102 to be in the off state such that this portion of the display screen 102 is transparent, or at least partially transparent, for allowing light (indicated by arrows) 126 to pass therethrough. As shown in FIG. 1, the light 126 passing through the transparent portion 124 originates from a portion 128 of an object 130. The light 126 may originate from any scenery or objects located near the display screen 102. In this example, the object 130 may be a viewer of the display screen 102, and the image projected onto and captured by the image capture device 104 may include the viewer and any other scenery behind or near the viewer. The light 126 reaches the electronic image sensor of the image capture device 104 where the light projects an image thereon of the object portion 128.

In an example, different portions of the display screen 102 may be controlled to be inactive in the sequence. As a result, the different portions of the display screen 102 may become at least partially transparent for allowing light to pass through different portions of the display screen 102. In this way, different portions of the image of the viewer, other objects, and/or any other scenery behind or near the viewer are sequentially projected onto the image capture device 104. The image capture device 104 may capture each image in the sequence and store the images in a memory 132. As described in more detail herein, the captured images may be stitched together for generating a composite image of the viewer, other objects, and/or any other scenery. Further, several composite images may be generated based on images collected over a period of time for generating a video of the viewer, other objects, and/or any other scenery.

Figure 3A:
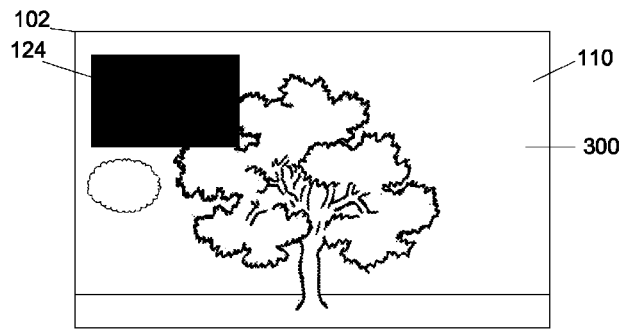
FIGS. 3A-3C illustrate a front view of a display side of a display screen displaying images in a sequence and including partially transparent portions that are at least partially transparent in accordance with embodiments of the present invention.
Figure 3B:
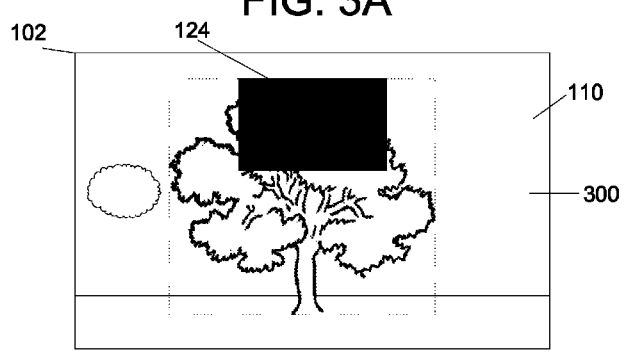
Figure 3C:
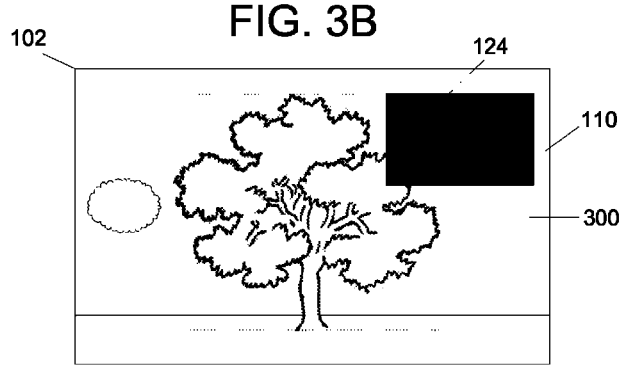

FIGS. 3A-3C illustrate a front view of a display side 110 of a display screen 102 displaying images in a sequence and including partially transparent portions 124 that are at least partially transparent in accordance with embodiments of the present invention. In FIGS. 3A-3C, the first image displayed in the sequence begins with FIG. 3A and continues in order to the last image shown in FIG. 3C. This example sequence of images is a video of a scene including a tree and surrounding scenery. In each figure, portion 300 corresponds to an area of the display screen 102 where a different set of light emitting components is activated to display the image of the scene in the sequence. The transparent portion 124 in each figure corresponds to a portion of the display screen 102 where the light emitting components are inactive for allowing light to pass through the display screen 102 and onto an image capture device positioned behind the display screen 102. The light passing through the display screen 102 can project a sequence of images on the image capture device. The image capture device may capture the images. For example, the projected images may include an image of the portion 128 of the object 130 shown in FIG. 1. The projected images may also include images of other portions of the object 130 and/or any nearby objects or scenery. As illustrated, the position of the transparent portion 124 on the display screen 102 is different in each figure such that images of different portions of the object 130 and/or any nearby objects or scenery are projected onto and captured by the image capture device 104. As described in further detail herein, the different captured images of an object and/or scenery surrounding the front side of the display screen 102 can be stitched together to form a composite still image. In accordance with embodiments of present invention, multiple, composite still images can be sequenced together for generating a video of the object 130 and/or any nearby objects or scenery.

Returning to the method of FIG. 2, the method includes using 206 the image capture device to capture the sequence of projected images. For example, an electronic image sensor of the image capture device 104 may capture images projected by light passing through the partially transparent portion 124 or other partially transparent portions of the display screen 102. Continuing the aforementioned example of FIG. 3, the image capture device 104 may be controlled to capture the images projected by light passing through the partially transparent portions 124 and to generate image data representative of the projected images. The image capture interface 118 may receive the image data and store the image data in memory 132.

In accordance with embodiments of the present invention, the image capture device 104 may capture images displayed by the display screen 102. For example, activated OLEDs of the display screen may display images on the front and back sides of the display screen. Images displayed on the back side of the display screen may be projected onto and captured by the image capture device. For example, the back side 112 of the display screen 102 may project light 134 from activated light emitting components onto the image capture device 104. The displayed images projected by the light 134 may be captured in sequence along with the capture of images projected by light 134 passing through the partially transparent portion 124. For example, the image capture device 104 may capture a sequence of image frames that each contains a displayed image and the image projected by the light passing through the partially transparent portion. The captured sequence of images may be stored in the memory 132 as image data.

Figure 4A:
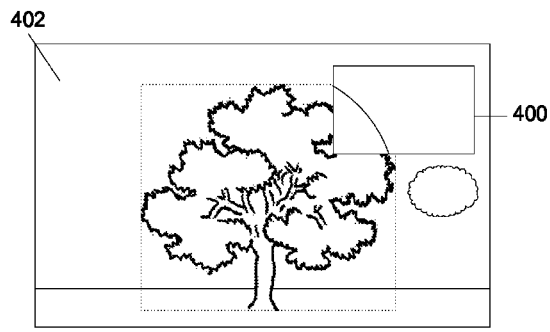
FIGS. 4A-4C illustrate a sequence of image frames captured by an image capture device and corresponding to the images generated by the display screen shown in FIGS. 3A-3C, respectively, in accordance with embodiments of the present invention.
Figure 4B:
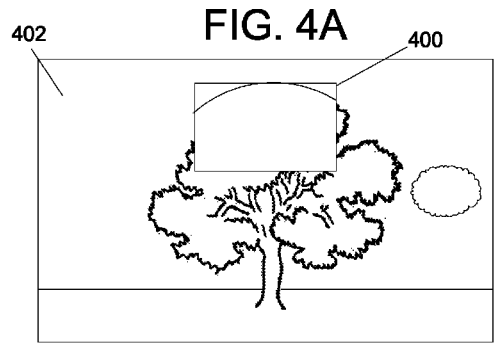
Figure 4C:
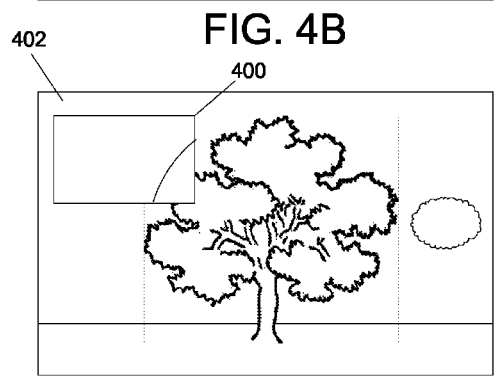

Continuing the example of FIGS. 3A-3C, FIGS. 4A-4C illustrate a sequence of image frames captured by an image capture device and corresponding to the capture of images projected by the display screen shown in FIGS. 3A-3C, respectively, in accordance with embodiments of the present invention. Particularly, the image frames shown in FIGS. 4A-4C are those captured by the image capture device 104 while the display screen displays the images shown in FIGS. 3A-3C, respectively, and the images of the object 130 shown in FIG. 1 are projected through the transparent portion 124. In each image of FIGS. 4A-4C, image portion 400 corresponds to the image projected onto the image capture device by light passing through the transparent portion 124 shown in FIGS. 3A-3C. Further, in each image of FIGS. 4A-4C, image portion 402 corresponds to the image projected onto the image capture device by the image displayed by the display screen 102. These images may be stored in the memory 132 and time stamped. The images may be captured by the image capture device at the same or similar rate as the display screen sequentially displays images in sequence or image frames of a video.

The method of FIG. 2 includes generating 208 a still image based on the captured sequence of images. For example, an image generator 136 of the system 100 shown in FIG. 1 may retrieve the captured image frames illustrated FIGS. 4A-4C from the memory 132, and identify the image data in the frames that represents the images generated by the light that passed through the portions 400. The image generator 136 may assign this identified image data for each image frame as a component for use in generating a composite still image. Further, the image generator 136 may stitch together the components to generate the composite still image. For example, the portions 400 may be parts of an image of the object 130. In another example, the image data acquired from the projected image may be made into a video.

Figure 5:
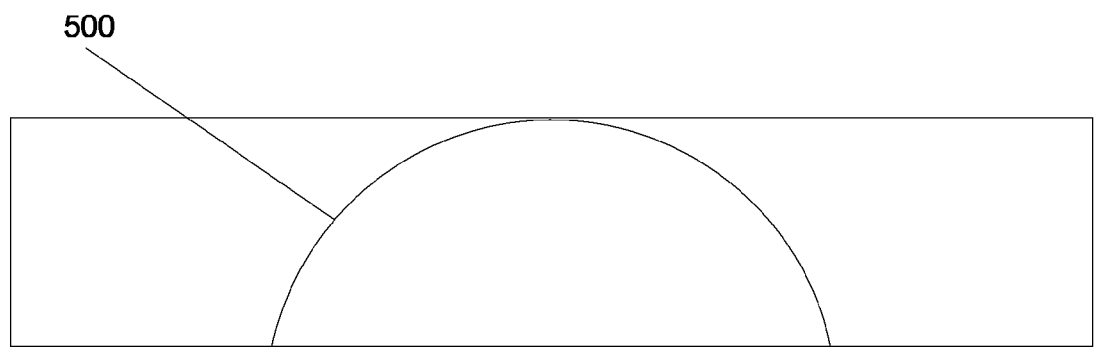
FIG. 5 is a still image consisting of the stitched-together portions shown in FIGS. 4A-4C in accordance with embodiments of the present invention.

As an example, FIG. 5 illustrates the composite still image consisting of the stitched-together portions 400 shown in FIGS. 4A-4C. Referring to FIG. 5, the still image shows an image 500 of the object 130.

Although three transparent portions of the display screen are provided in the sequence of FIGS. 3A-3C and used in the example of FIGS. 4A-4C, it is emphasized the controller 114 may control the generation of any number of fully transparent or at least partially transparent portions in a sequence for capturing an image of objects and/or scenery near the display screen. Further, the transparent portions in the sequence may be positioned anywhere on the display screen. Further, the transparent portions may be of any suitable shape or size. The positioning, sequencing, sizes, and shapes of transparent portions may be suitably implemented by controlling the deactivation of light emitting components of the display screen such that groups of the light emitting components are suitably switched off in accordance with a desired position, shape, and/or size of a transparent portion.

In accordance with embodiments of the present invention, generation of a still image based on a captured sequence of images may include determining which portions of an image captured by the image capture device are to be used as components for generating the composite still image. For example, referring to FIGS. 4A-4C, each of the captured images include the image portion 400 that corresponds to the image projected onto the image capture device by light passing through the transparent portion of the display screen. Each of the captured images may also include the image portion 402 that corresponds to the image projected onto the image capture device by the image displayed by the display screen 102. The image generator 136 may identify the image portions 400 in each of the captured images for use in generating the still image. In accordance with embodiments of the present invention, the image generator 136 may identify the image portions 400 by comparing each captured image to the displayed image data. The image generator 136 may determine that the image portions 400 do not match the displayed image data. In response to determining that an image portion does not match the display image data, the image generator 136 may use that image portion for generating the still image. For example, the image generator 136 may stitch together the image portions that do not match the display image based on an ordering of the capture of the images and/or positioning of the image portion in the captured image. For example, the captured image portions may be stitched together in the same position on an image that the captured image portions were located in the originally-captured image.

In accordance with embodiments of the present invention, the image generator 136 may identify the image portions to be used in generating the still image based on an ordering of the capture of the images and expected positions of the images within the captured images at the time of capture. For example, referring to FIGS. 4A-4C, the image generator 136 may store coordinates of an expected position of an image portion 400 when the image is captured based on the positioning of the light emitting coordinates that are inactive at the time of capture. The image generator 136 may use the image portions at the expected position coordinates for generating the still image. For example, the image generator 136 may stitch together the image portions at the expected position coordinates. In an example, the captured image portions may be stitched together in the same position on an image that the captured image portions were in the originally captured image.

In accordance with embodiments of the present invention, an image capture controller may receive a set of instructions for controlling a display screen to display a sequence of images. For example, the controller 114 shown in FIG. 1 may receive a set of instructions for controlling the display screen 102 to display a sequence of still images or video. Such instructions may include stored frames of still image data and video data in a suitable image file format, such as, but not limited to, PNG, JPEG, GIF, Exif, TIFF, RAW, BMP, PPM, PGM, PBM, PNM, WEBP, and MPEG. The stored data may identify portions of each image for display that may be inactive when the image is displayed on a display screen. For example, the stored data may identify coordinates of portions 400 shown in FIGS. 4A-4C. These instructions may be used for controlling light emitting components of a display screen to activate in a sequence for displaying the sequence of images, and for controlling other light emitting components of the display screen that are not activated for displaying the images to be inactive such that a portion of the display screen is at least partially transparent in accordance with embodiments of the present invention.

In cases when coordinates of such portions are not identified in the received set of instructions, the controller 114 may alter the set of instructions for identifying portions of at least some of the images such that portions of the display screen corresponding to the identified portions become inactive when the corresponding image in the set of instructions is displayed. For example, the identified portions to become inactive may be the portions that become transparent such that light passes therethrough in accordance with embodiments of the present invention. A portion of an image to become inactive may correspond to portions of the image considered to be uninteresting to a viewer of the image. For example, the controller 114 may avoid inactivating portions corresponding to focal objects, such as people, in an image. Rather, the controller 114 may inactivate portions corresponding to background scenery. Focal objects and background scenery in an image may be identified by suitable techniques.

In accordance with embodiments of the present invention, a dithering technique may be applied for selecting light emitting components to activate to display an image on a display screen. The light emitting components that are not selected for activation may be controlled to be inactive such that light may pass therethrough for projecting an image on the image capture device in accordance with embodiments of the present invention. The captured images of light passing through the transparent portions is the inverse dither sequence of the displayed image. The captured image data may be used to dither the display data. The result can be a display image that is dithered to optimize both the projection to the image capture device and the displayed image. In an example, dithering may be used to create the illusion of new colors and shades by varying the pattern of pixels. Particularly, for example, the illusion of shades of gray may be produced by varying patterns of black and white dots.

Alternative to the still images and video being received from system memory, video or images for presentation on a display screen may be received from an image or video source. Example image and video sources include, but not limited to, a set-top-box (STB), a DVD player, a personal video recorder (PVR) a computer, cable/satellite broadcast television, and the like. Such sources may not have portions that are identified to become inactive. In accordance with embodiments of the present invention, such portions may be dynamically identified by an image capture controller prior to controlling the display screen to display the image or video.

When not operating in the image capture and display mode, the system 100 may operate in a display-only mode or an image capture-only mode. In the display-only mode, the controller 114 may control the display screen 102 to display still images and video, and the image capture device 104 may be turned off or otherwise set in an inactive state. Further, in the display-only mode, the display screen 102 may display still image or video that are viewable on the front display side 112. The memory 132 may store frames of still image data and video data. The controller 116 or another component of the system 100 may access the still image data and video data stored in the memory 132 for use in controlling the display screen 102 to display the still images and video.

In the image capture-only mode, the display screen 102 may be turned off to become at least partially transparent. Thereby, light may pass through the display screen 102 for projecting images on the image capture device 104. The image capture device 104 may capture the projected images and store a representation of the images in the memory 132.

In other modes, the display screen 102 and/or image capture device 104 may be turned off or otherwise set to an inactive state for power conservation.

In accordance with embodiments of the present invention, the light generated by the display screen may be used for illuminating an object for capture of an image of the object by the image capture device. For example, the object 130 may be illuminated by the display screen 102. In this example, light reflecting from the object 130 may return towards the display screen 102, pass through the partially transparent portions, and project onto the image capture device 104 for use in generating still images and video in accordance with embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or diagrams of methods, apparatus (systems) and computer program products according to embodiments of the invention. For example, aspects of the present invention are described with reference to the diagram of FIG. 1 and the flowchart of FIG. 2. It will be understood that each block of the flowchart illustrations and/or diagrams, and combinations of blocks in the flowchart illustrations and/or diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
controlling different groups of light emitting components of a display screen to activate in a predetermined sequence for displaying a sequence of images;
controlling other light emitting components of the display screen that are not activated for displaying the sequence of images to be inactive such that different portions of the display screen are at least partially transparent for allowing light to pass therethrough for projecting different portions of a scene onto predetermined portions of an image capture device in coordination with the predetermined sequence;
using the image capture device to capture the sequence of projected portions of the scene; and
generating a still image of the scene based on the captured sequence of projected portions of the scene.

2. The method of claim 1, wherein the light emitting components comprise light emitting diodes (LEDs).

3. The method of claim 1, wherein using the image capture device comprises using the image capture device to capture the projected images of the different portions of the scene, and
wherein generating a still image comprises stitching together the projected images of the different portions of the scene to generate the still image.

4. The method of claim 1, comprising storing frames of image data, wherein the image data of each frame represents one of the images generated by light projected onto the image capture device by the sequence of displayed images and one of the images in the sequence generated by light passing through the portion of the display screen that is at least partially transparent, and
wherein generating a still image comprises:
for each frame:
identifying the image data that represents the images generated by light passing through the portion of the display screen that is at least partially transparent; and
assigning the identified image data as a component in the still image; and
stitching together the components to generate the still image.

5. The method of claim 1, comprising:
receiving a set of instructions for controlling the display screen to display the sequence of images; and
altering the set of instructions to include instructions for identifying portions of at least some of the images such that portions of the display screen corresponding to the identified portions become inactive when the corresponding image is displayed.

6. The method of claim 5, wherein the identified portions correspond to the other light emitting components of the display screen that are not activated.

7. A system comprising:
an image controller configured to:
control different groups of light emitting components of a display screen to activate in a predetermined sequence for displaying a sequence of images; and
control other light emitting components of the display screen that are not activated for displaying the sequence of images to be inactive such that different portions of the display screen are at least partially transparent for allowing light to pass therethrough for projecting different portions of a scene onto predetermined portions of an image capture device in coordination with the predetermined sequence;
wherein the image capture device is configured and positioned to capture the sequence of projected portions of the scene; and
an image generator configured to generate a still image of the scene based on the captured sequence of projected portions of the scene.

8. The system of claim 7, wherein the light emitting components comprise light emitting diodes (LEDs).

9. The system of claim 7, wherein the image capture device is configured to capture the projected images of the different portions of the scene, and
wherein the image generator is configured to stitch together the projected images of the different portions of the scene to generate the still image.

10. The system of claim 7, comprising a memory configured to store frames of image data, wherein the image data of each frame represents one of the images generated by light projected onto the image capture device by the sequence of displayed images and one of the images in the sequence generated by light passing through the portion of the display screen that is at least partially transparent, and
wherein the image generator is configured to:
for each frame:
identify the image data that represents the images generated by light passing through the portion of the display screen that is at least partially transparent; and
assign the identified image data as a component in the still image; and
stitching together the components to generate the still image.

11. The system of claim 7, wherein the image controller is configured to:
receive a set of instructions for controlling the display screen to display the sequence of images; and
alter the set of instructions to include instructions for identifying portions of at least some of the images such that portions of the display screen corresponding to the identified portions become inactive when the corresponding image is displayed.

12. The system of claim 11, wherein the identified portions correspond to the other light emitting components of the display screen that are not activated.

13. A computer program product for generating an image by capture of images projected by light passing through a display screen, said computer program product comprising:
a non-transitory computer readable storage medium having computer readable program code embodied therewith, the computer readable program code comprising:
computer readable program code configured to control different groups of light emitting components of a display screen to activate in a predetermined sequence for displaying a sequence of images;
computer readable program code configured to control other light emitting components of the display screen that are not activated for displaying the sequence of images to be inactive such that different portions of the display screen are at least partially transparent for allowing light to pass therethrough for projecting different portions of a scene onto predetermined portions of an image capture device in coordination with the predetermined sequence;
computer readable program code configured to use the image capture device to capture the sequence of projected portions of the scene; and
computer readable program code configured to generate a still image of the scene based on the captured sequence of projected portions of the scene.

14. The computer program product of claim 13, wherein said computer program product comprises:
computer readable program code configured to use the image capture device to capture the projected images of the different portions of the scene, and
computer readable program code configured to stitch together the projected images of the different portions of the scene to generate the still image.

15. The computer program product of claim 13, wherein said computer program product comprises:
computer readable program code configured to receive a set of instructions for controlling the display screen to display the sequence of images; and
computer readable program code configured to alter the set of instructions to include instructions for identifying portions of at least some of the images such that portions of the display screen corresponding to the identified portions become inactive when the corresponding image is displayed.

* * * * *